(12) United States Patent
Porvali et al.

(10) Patent No.: US 9,555,975 B2
(45) Date of Patent: Jan. 31, 2017

(54) MINERAL MATERIAL FEED APPARATUS, A PLANT AND A METHOD

(71) Applicant: Metso Minerals, Inc., Helsinki (FI)

(72) Inventors: Sami Porvali, Sahalahti (FI); Riku Yla-Outinen, Tampere (FI)

(73) Assignee: Metso Minerals, Inc., Helsinki (FI)

( * ) Notice: Subject to any disclaimer, the term of this patent is extended or adjusted under 35 U.S.C. 154(b) by 0 days.

(21) Appl. No.: 14/440,616

(22) PCT Filed: Dec. 12, 2013

(86) PCT No.: PCT/FI2013/051159
§ 371 (c)(1),
(2) Date: May 5, 2015

(87) PCT Pub. No.: WO2014/096533
PCT Pub. Date: Jun. 26, 2014

(65) Prior Publication Data
US 2015/0291365 A1    Oct. 15, 2015

(30) Foreign Application Priority Data
Dec. 21, 2012   (FI) ..................................... 20126366

(51) Int. Cl.
*B65G 15/00*   (2006.01)
*B65G 37/00*   (2006.01)
(Continued)

(52) U.S. Cl.
CPC ............... *B65G 37/00* (2013.01); *B02C 23/02* (2013.01); *B07B 11/06* (2013.01)

(58) Field of Classification Search
CPC ........... B65G 37/00; B07B 11/06; B02C 23/02
(Continued)

(56) References Cited

U.S. PATENT DOCUMENTS

| 2,593,084 A | 4/1952 | Anderson |
| 4,244,674 A | 1/1981 | Amunson |
| (Continued) | | |

FOREIGN PATENT DOCUMENTS

| CN | 202366748    | 8/2012 |
| JP | H09-155227 A | 6/1997 |
| (Continued) | | |

OTHER PUBLICATIONS

PCT Search Report dated Apr. 14, 2014.
(Continued)

*Primary Examiner* — William R Harp
(74) *Attorney, Agent, or Firm* — Andrus Intellectual Property Law, LLP

(57) ABSTRACT

A feed apparatus for feeding mineral material includes a first frame, a feed box fixed to the first frame and having walls for the mineral material to be loaded to the apparatus, and a feed device joined to the first frame so that the material ends up onto a transport surface of a transport member of the feed device. The transport surface and a bottom edge of the wall of the feed box form a gap therebetween. The feed apparatus includes distance adjustment members to move the transport surface and the bottom edge relative to each other. Preferably the distance adjustment members are pivoted on the first frame and the feed device. A method for adjusting the feed apparatus includes moving the transport surface of the feed device and the bottom edge of the wall of the feed box relative to each other by distance adjustment members.

18 Claims, 3 Drawing Sheets

(51) Int. Cl.
*B02C 23/02* (2006.01)
*B07B 11/06* (2006.01)

(58) Field of Classification Search
USPC .......................... 198/523–569, 861.1–861.6
See application file for complete search history.

(56) References Cited

U.S. PATENT DOCUMENTS

| 5,074,435 A | 12/1991 | Suverkrop et al. |
| 2007/0102549 A1 | 5/2007 | Kitaguchi |

FOREIGN PATENT DOCUMENTS

| JP | 2003-211018 A | 7/2003 |
| WO | 2006/120299 A1 | 11/2006 |

OTHER PUBLICATIONS

PCT Written Opinion dated Apr. 14, 2014.
FI Search Report dated Oct. 17, 2013.
Office Action for Chinese Patent Application No. 2013800674544 issued Jul. 22, 2016.
Search Report for Chinese Patent Application No. 2013800674544 dated Jul. 13, 2016.

MINERAL MATERIAL FEED APPARATUS, A PLANT AND A METHOD

CROSS-REFERENCE TO RELATED APPLICATIONS

This application claims priority to PCT/FI2013/051159, filed Dec. 12, 2013, and published in English on Jun. 26, 2014 as publication number WO 2014/096533, which claims priority to FI Application No. 20126366, filed Dec. 21, 2012, incorporated herein by reference.

TECHNICAL FIELD

The invention relates to a feed apparatus and a method for adjusting a mineral material feed apparatus. The invention relates particularly, though not exclusively, to a mineral material feed apparatus in which material, fed into a feed hopper or a corresponding feed box, is moved forwards by a feed device.

BACKGROUND ART

Mineral material, for example rock, is gained from the earth for processing by exploding or excavating. The rock can also be natural rock and gravel or construction waste. The processing is typically crushing and/or screening of material. Mobile processing plants and stationary applications are used in the processing. An excavator or wheeled loader loads the material to be processed into the processing plant's feed hopper or feed box from where a feeder moves the material to be processed into a crushing chamber of a crusher or onto a screen deck. The material to be processed may also be recyclable material such as concrete, plastic, wood, metal, bricks, or asphalt.

The mobile material processing plants are track or wheel based and may comprise means suitable for material processing such as a feed hopper, a feeder, a crusher, a screen and one or more conveyors for moving the processed material for storing or further processing.

In a known solution a feed conveyor is fixed with bolts against structures of the feed hopper wherein the feed conveyor and the feed hopper form a stiff feed entity. Manufacturing inaccuracies of the feed conveyor and of the structures being the object of the fixing complicate the fixing of the feed conveyor. The desired distance between the feed conveyor and the feed hopper is not achieved easily. Adjusting washers are used for adjusting the distance what is and difficult.

Mounting inaccuracies caused by the interface between the feed hopper and the feed conveyor complicate the operation of the feeder. In some cases a gap between a side wall of the feed hopper and a conveyor belt is too large or too small wherein the stones may between the side wall and the conveyor. If the gap between the side wall and the conveyor belt is too large material leaks through the side wall and the conveyor belt.

An object of the invention is to provide a feed apparatus in which a gap formed by a mineral material feed device and a feed box therebetween is adjustable. An object of the invention is to provide a feed apparatus in which a distance between a transport surface of a mineral material feed device and a bottom edge of a feed box is adjustable. An object of the invention is to provide a method for adjusting a distance between a mineral material feed apparatus and a feed hopper. An object of the invention is to provide a plant comprising a feed apparatus in which a distance between a transport surface of a mineral material feed device and a bottom edge of a feed box is adjustable.

SUMMARY

According to a first example aspect of the invention there is provided a feed apparatus for feeding mineral material comprising a first frame, a feed box fixed to the first frame and having walls for the mineral material to be loaded to the apparatus, and a feed device which is joined to the first frame so that the material to be loaded to the feed box ends up onto a transport surface of a transport member of the feed device, and the transport surface and a bottom edge of the wall of the feed box are forming a gap therebetween, and the feed apparatus comprises distance adjustment members to move the transport surface of the feed device and the bottom edge of the wall of the feed box relative to each other. Preferably said transport surface and bottom edge are moved to a given distance from each other.

According to a second example aspect of the invention there is provided a feed apparatus according to claim 1.

Preferably the distance adjustment members are configured to adjust a distance between the transport surface of the feed device and the bottom edge of the wall of the feed box.

Preferably the feed device comprises a second frame which is fixed by the distance adjustment members to an adjustable distance from the first frame.

Preferably the distance adjustment member is configured to adjust the distance between the first frame and the second frame.

Preferably the feed device comprises a second frame which is fixable by the distance adjustment members to an adjustable distance from the first frame.

Preferably the distance adjustment member comprises a screw and/or a screw actuator and/or a wedge actuator and/or a hydraulic actuator. The screw actuator can be a screw jack. A wedge can be moved by the screw. A lever can be moved by a wedge.

Preferably the distance adjustment member comprises a combination of the screw and a lever.

Preferably the distance adjustment member comprises a lever having a first pivot point which is pivoted to the first or a second frame and a second pivot point of the lever is located at a third distance from the first pivot point and is pivoted to a corresponding second or first frame acting as an adjustment pair, and the distance adjustment member comprises a screw which is, when operated, arranged to move the lever by acting to a screw support point comprised by the lever which screw support point is located at a fourth distance from the first pivot point.

Preferably the second pivot point of the lever is equipped with a combination of a shaft and a longitudinal groove which enables in the lever a longitudinal movement of the shaft, the movement being substantially in a longitudinal direction of the second frame.

Preferably the third distance between the first and second pivot points is smaller than the fourth distance between the screw support point and the first pivot point.

Preferably seals are fixed to the wall of the feed box by plates which are pressable towards a rear surface of the wall. Preferably the seals are directed towards the transport surface. Preferably the distance adjustment members are configured to decrease the distance between the transport surface of the feed device and the bottom edge of the wall of the feed box to compensate wear of the seals.

Preferably the distance of the seal from the transport surface is adjustable by changing a vertical fixing point of the seal relative to the wall, and an opening is formed to the plate for a tool to separate the seal from the plate.

Preferably a grip form for a tool is formed to the seal at place of an opening in the plate, for example a hole.

Preferably the adjusting member is configured to adjust stepless.

Preferably the feed device is a feed conveyor which comprises an endless transport member such as a belt.

Preferably the distance adjustment members are pivoted on the one hand to the first frame and on the other hand to the feed device.

According to some embodiments the walls of the feed box, preferably the bottom edges of the walls, are moved by the distance adjustment members relative to the transport surface of the feed device when the feed device is stationary. Preferably the distance adjustment member is pivoted on the one hand to the first frame and on the other hand to a feed hopper.

According to a third example aspect of the invention there is provided a processing plant for mineral material processing which processing plant comprises a feed apparatus according to any aspect or embodiment of the invention.

According to a fourth example aspect of the invention there is provided a method for adjusting a mineral material feed apparatus which feed apparatus comprises a first frame, a feed box fixed to the first frame and having walls for the mineral material to be loaded to the apparatus, and a feed device which is joined to the first frame so that the material to be loaded to the feed box ends up onto a transport surface of a transport member of the feed device, and the transport surface and a bottom edge of the wall of the feed box are forming a gap therebetween, and the method comprising moving the transport surface of the feed device and the bottom edge of the wall of the feed box relative to each other by distance adjustment members. Preferably said transport surface and bottom edge are moved to a given distance from each other. Preferably said gap is adjusted opening.

According to a fifth example aspect of the invention there is provided a method according to claim 17.

Following advantages can be achieved by the presented solutions. The adjustability of the distance between the feed device such as the feed conveyor and the feed hopper enhances operation of the feed apparatus.

Due to the adjustability of the distance between the feed device and the feed hopper, wedging of material in between the transport surface and the wall of the feed hopper can be reduced and so the usability of the process and of the apparatus operated in the process enhances. Due to the easy adjustability of the feed device the gap between the feed hopper and the feed device can easily be formed opening in the material transport direction by which the wedging of the material is reduced. Additionally, leaking of material from the feed hopper can be reduced and avoided.

Wearing of the seals directed towards the transport surface of the feed device can easily be compensated by adjusting the transport surface of the feed device to the direction of the seals. For example, the wear of the longitudinal seals of the feed conveyor can be easily compensated speedier than before by adjusting the conveyor and/or the seals so that down-time of the process caused by the adjustment is reduced. The adjustment of the longitudinal seals can be made more infrequently because the moving of the feed device towards the seals is easy. The adjustment of the longitudinal seals can in some cases be made easier among others by forming the longitudinal seal unitary instead several seals. The plates pressing the seal can additionally be formed of several short parts wherein the detaching of a seal sticked to the plate becomes easier. The detaching of the seal from the plate and the rear wall of the feed box can be facilitated by the one or several openings formed to the plate and/or by the grip form formed to the seal.

The manufacturing accuracies of the structures such as the frame structures, the feed hopper, the feed device used in the solution must not be increased in order to pass over the difficulties caused by the mounting interface so that the manufacturing costs and the time consumed in the manufacturing can be maintained at least same.

Different embodiments of the present invention will be illustrated or have been illustrated only in connection with some aspects of the invention. A skilled person appreciates that any embodiment of an aspect of the invention may apply to the same aspect of the invention and other aspects alone or in combination with other embodiments as well.

BRIEF DESCRIPTION OF THE DRAWINGS

The invention will be described, by way of example, with reference to the accompanying drawings in which.

DETAILED DESCRIPTION

In the following description, like numbers denote like elements. It should be appreciated that the illustrated drawings are not entirely in scale, and that the drawings mainly serve the purpose of illustrating some example embodiments of the invention.

Figure 1:
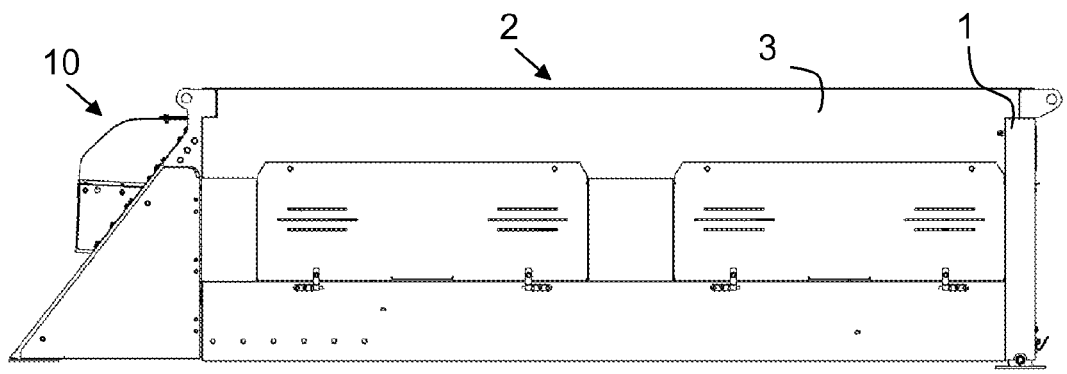
FIG. 1 shows a side view of a feed apparatus according to an embodiment of the invention.

FIG. 1 shows a side view of a feed apparatus 10 for a mobile mineral material processing plant. The feed apparatus comprises a first frame 1 to which is fixed a feed box 2 of which the term feed hopper is used also in some cases. The feed box has walls 3 for mineral material to be loaded to the feed apparatus and to guide the mineral material onto a feed device 4 below the feed box.

The invention is not limited to the embodiment of the feed apparatus having stationary walls shown in this description. The solution of the invention relates also to such a feed hopper which has side pivotable walls. A feed hopper equipped with pivotable walls is shown in publication EP1771252B1.

Figure 2:
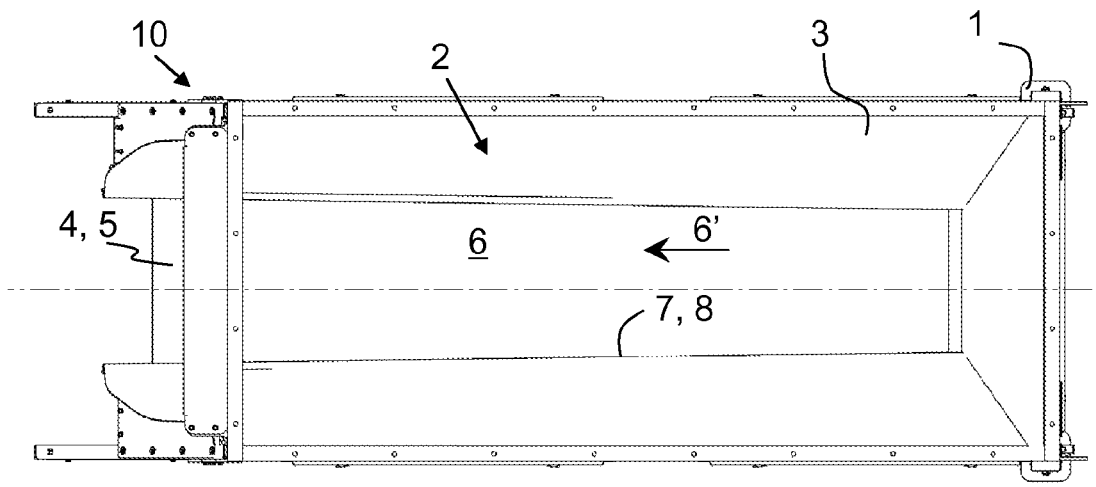
FIG. 2 shows a top view of the feed apparatus according to FIG. 1.

FIG. 2 shows a top view of the feed apparatus 10 according to FIG. 1 comprising a feed conveyor 4 which is fixed to the first frame 1 so that the material loaded to the feed box ends up onto a transport surface 6 of an endless transport member 5 such as a belt of the feed conveyor. The transport surface of the transport belt and a bottom edge 7 of the wall 3 of the feed box form a gap 8 therebetween which gap is preferably adjusted opening in the feed direction (arrow 6') of the transport member. The opening of the gap 8 can be for example 4 mm along a direct path of the transport surface 6 or be for example 0.1°.

The invention is not limited to the embodiment of the feed apparatus shown in this description in which the feed device is a feed conveyor. As the feed device can operate also for example an apron feeder, a plate feeder or a vibration feeder. The feeder can also be scalping, separating fine material from the material to be crushed before the crushing.

The feed apparatus comprises distance adjustment members 11 shown in FIGS. 3 to 6 for adjusting the gap 8 between the transport surface 6 of the feed device 4 and the bottom edge 7 of the wall of the feed box. Additionally to the adjustment of the gap 8 the feed device is fixed to the first frame 1 by the distance adjustment members. A distance 8' between the transport surface 6 of the feed conveyor 4 and the bottom edge 7 of the wall 3 of the feed box is adjusted and the distance is locked desired by the distance adjustment members 11.

Figure 3:
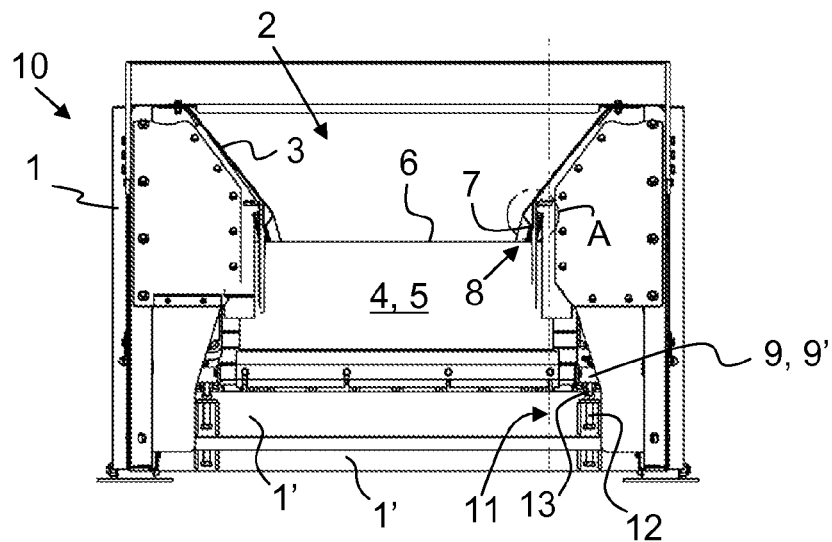
FIG. 3 shows the feed apparatus according to FIG. 1 from direction of a material discharge end.

FIG. 3 shows the feed apparatus from direction of a material discharge end. A detail A is shown in more detail in FIG. 7. The feed conveyor 4 comprises a second frame 9 to which are fixed turning members of the endless belt. The second frame 9 is fixed by the distance adjustment members 11 to an adjustable distance from the first frame 1. The distance adjustment members are fixed preferably to cross beams 1' of the first frame 1. The distance adjustment members are fixed preferably to cross beams 9' of the second frame 9.

Figure 4:
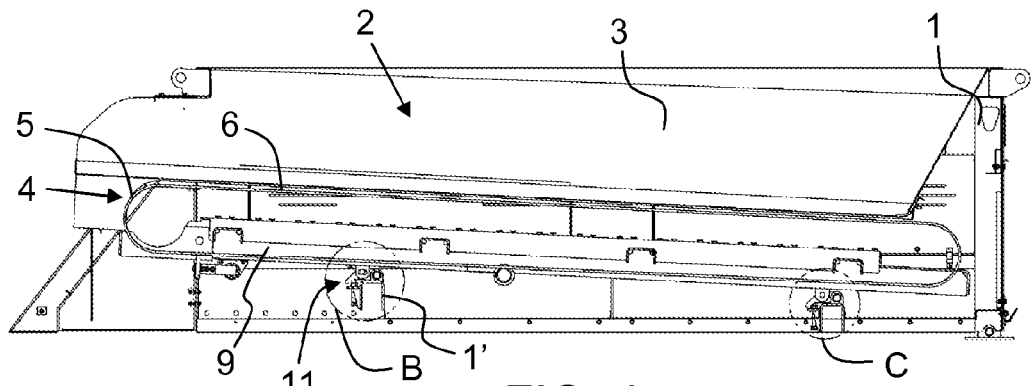
FIG. 4 shows a side view of a cross section of the feed apparatus according to FIG. 1.

FIG. 4 shows a side view of a cross section of the feed apparatus 10 where the feed conveyor 4 in directions of the starting and discharge ends supported by the distance adjustment members 11 to the first frame 1. Distance adjustment members are arranged on cross beams 1' shown at right and left in the apparatus of FIGS. 3 and 4, two parallel on both cross beams. The starting and discharge ends of the feed conveyor can be adjusted separately wherein size and opening of the gap 8 can be adjusted. Naturally there can be arranged any other number of distance adjustment members than the four shown with the Figures, for example two or three or more than four pieces. Preferably at least one distance adjustment member is in the direction of both the starting end and the discharge end.

Figure 5:
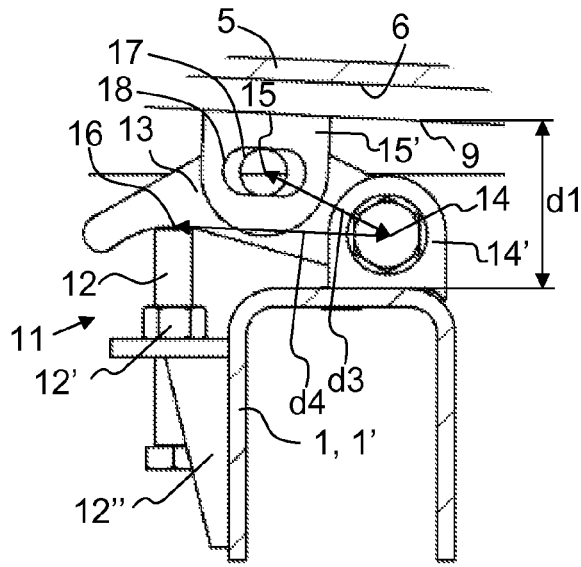
FIG. 5 shows a distance adjusting member according to a first embodiment of the invention, detail B of FIG. 4.

FIG. 5 shows a distance adjusting member 11 according to a first embodiment of the invention in the detail B of FIG. 4. The distance adjustment member comprises a screw 12 and an inner thread part 12' such as a nut which is fixed through a support 12" to the first frame 1, particularly to the cross beam 1'. The screw 12 operates as a combination with a lever 13 in the distance adjustment member. A first pivot point 14 of the lever is pivoted to the first frame 1 through a shaft and a first support 14'. A second pivot point 15 of the lever is pivoted to the second frame 9 through a shaft 17 and a second support 15'. The second pivot point 15 is equipped with a combination of the shaft 17 and a longitudinal groove 18 formed to the second support which combination allows a longitudinal movement of the shaft in the lever, the movement being substantially in the longitudinal direction of the second frame 9.

The second pivot point 15 is located at a third distance d3 from the first pivot point 14. The screw 12, when operated, is arranged to move the lever 13 by acting to a support point 16 comprised by the screw which support point is located at a fourth distance d4 from the first pivot point. Preferably the third distance d3 is smaller than the fourth distance d4. A gear ratio of the force of the distance adjustment member can be increased by increasing the ratio of the fourth and third distances what eases rotating of the screw. For example gear ratio 0.5 can be arranged with the lever.

Figure 6:
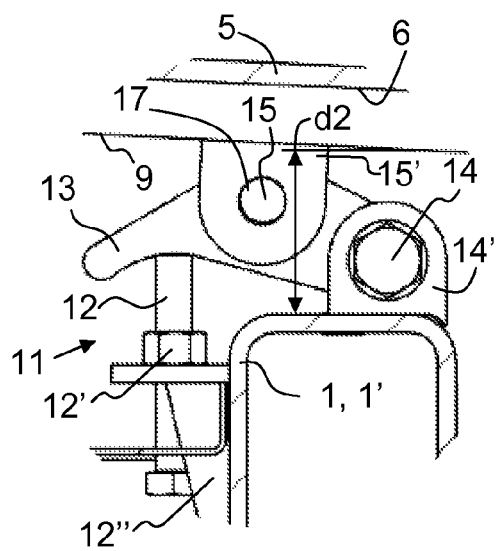
FIG. 6 shows a distance adjusting member according to a second embodiment of the invention, detail C of FIG. 4.

FIG. 6 shows a distance adjusting member according to a second embodiment of the invention in the detail C of FIG. 4. The second embodiment corresponds to the first embodiment with regard to other parts but a pivot formed by the second support 15' and the shaft 17 allows pivoting of the lever 13 but no longitudinal movement.

Figure 7:
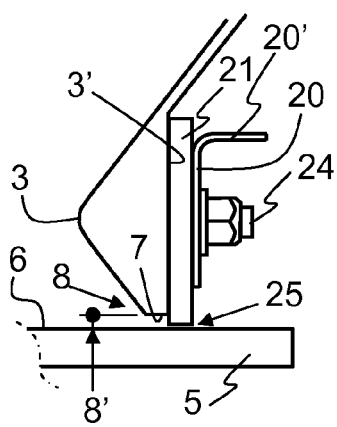
FIG. 7 shows a cross section of an adjustment solution of a longitudinal seal, detail A of FIG. 3.

FIG. 7 shows a cross section of an adjustment solution of a longitudinal seal 21, the detail A of FIG. 3. The seal 21 which is directed towards the transport surface 6 is fixed to the wall 3 of the feed hopper or the feed box 2 by plates 20 which are pressable towards a rear surface 3' of the wall. The plate 20 is pressed fixed by screws 24. The plate 20 can be gripped and it can be hit vertically at a protrusion 20'. The distance 8' between the transport surface 6 of the feed device 4 and the bottom edge 7 of the wall 3 of the feed box can be decreased by the distance adjustment members 11 to compensate wear of the seal 21. A distance 25 between the transport surface and a bottom surface of the seal can be decreased by the distance adjustment members 11 to compensate the wear of the seal 21.

The distance 25 of the bottom surface of the seal 21 from the transport surface 6 can be adjusted by changing a vertical fixing point of the seal relative to the wall 3. Preferably an opening 22 is formed to the plate 20 for a tool to separate the seal from the plate.

Figure 8:
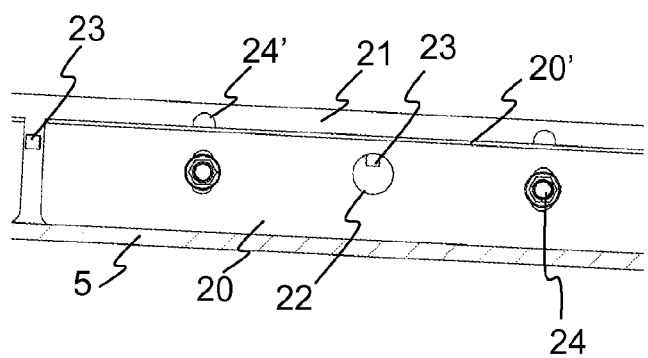
FIG. 8 shows a side view of the adjustment solution of the seal.

FIG. 8 shows a side view of the adjustment solution of the seal of FIG. 7 where a grip form 23 for a tool is formed to the seal 21 at least at places of the openings 22, for example a hole. The grip form facilitates the moving and detaching of the seal from the plate.

Figure 9:
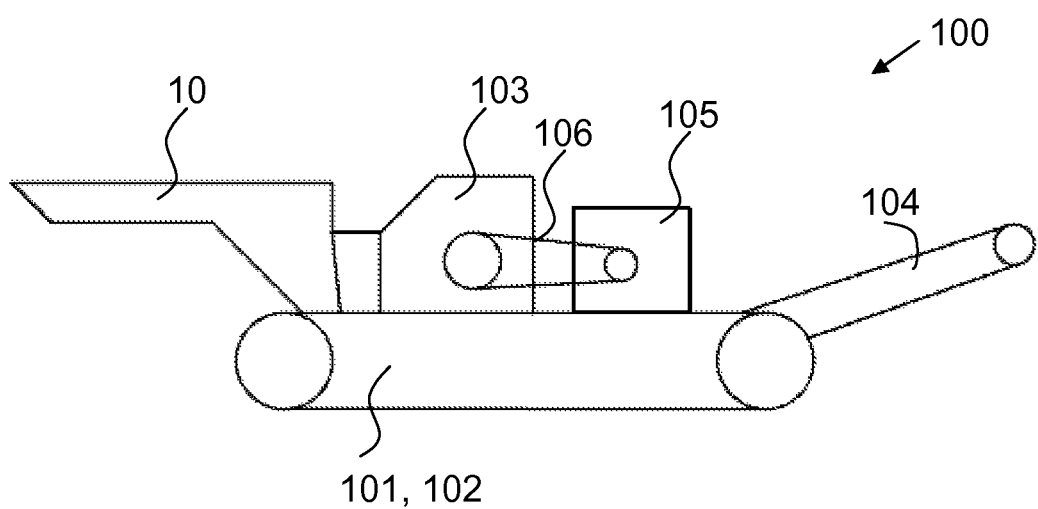
FIG. 9 shows a processing plant comprising a feed apparatus to feed material to be processed to a processing device of the plant.

FIG. 9 shows a mineral material processing plant 100 which is suitable for example to open pits for crushing stone material. The processing plant comprises a frame 101 to which is fixed a track base 102 for enabling independent moving, the feed apparatus 10 for feeding material to be processed to the processing device 103 such as a crusher, and a conveyor 104 for conveying crushed material further to for example a pile beneath the processing plant. Additionally the processing plant may comprise a power source 105 such as an electric, a diesel or another type motor and a motor control, and a transmission 106 from the power source to the processing device 103.

Instead of the track base 102 the moving can be enabled for example also with legs, skids or wheels. The processing plant 100 with the track base can be transported on road on a carriage or a corresponding transport arrangement. With a wheel base it may be towable on road preferably by a truck.

The mineral material processing device 104 may be a crusher, for example a jaw crusher, a gyratory crusher, a cone crusher, a HSI crusher or a VSI crusher. The processing device may also be a screening means such as a one-deck or multi-deck screen or a scalper. The feed apparatus 10 can also be placed in a stationary processing plant.

The foregoing description provides non-limiting examples of some embodiments of the invention. It is clear to a person skilled in the art that the invention is not restricted to details presented, but that the invention can be implemented in other equivalent means. Some of the features of the above-disclosed embodiments may be used to advantage without the use of other features.

As such, the foregoing description shall be considered as merely illustrative of principles of the invention, and not in limitation thereof. Hence, the scope of the invention is only restricted by the appended patent claims.

The invention claimed is:

1. A feed apparatus for feeding mineral material comprising:
   a first frame;
   a feed box fixed to the first frame and having walls for the mineral material to be loaded to the apparatus; and
   a feed device joined to the first frame so that the material to be loaded to the feed box ends up onto a transport surface of a transport member of the feed device, the transport surface and a bottom edge of the wall of the feed box forming a gap therebetween;
   wherein the feed apparatus comprises distance adjustment members to move the transport surface of the feed device and the bottom edge of the wall of the feed box relative to each other;
   the feed device further comprises a second frame fixed by the distance adjustment members to an adjustable distance from the first frame;
   wherein the distance adjustment members comprise a lever having a first pivot point pivoted to the first or a second frame and a second pivot point of the lever located at a third distance from the first pivot point and is pivoted to a corresponding second or first frame acting as an adjustment pair; and
   the distance adjustment members comprise a screw which is, when operated, arranged to move the lever.

2. The feed apparatus of claim 1, wherein the distance adjustment members are configured to adjust a distance between the transport surface of the feed device and the bottom edge of the wall of the feed box.

3. The feed apparatus of claim 1, wherein at least one of the distance adjustment members is configured to adjust the distance between the first frame and the second frame.

4. The feed apparatus of claim 1, wherein the feed device comprises a second frame fixable by the distance adjustment members to an adjustable distance from the first frame.

5. The feed apparatus of claim 1, wherein the distance adjustment members comprise at least one item selected from a group consisting of: a screw; a screw actuator; a wedge actuator; and a hydraulic actuator.

6. The feed apparatus of claim 5, wherein at least one of the distance adjustment members comprise a combination of the screw and a lever.

7. The feed apparatus of claim 1, wherein the screw is, when operated, arranged to move the lever by acting to a screw support point comprised by the lever which screw support point is located at a fourth distance from the first pivot point.

8. The feed apparatus of claim 7, wherein the second pivot point of the lever is equipped with a combination of a shaft and a longitudinal groove which enables in the lever a longitudinal movement of the shaft, the movement being substantially in a longitudinal direction of the second frame.

9. The feed apparatus of claim 7, wherein the third distance between the first and second pivot points is smaller than the fourth distance between the screw support point and the first pivot point.

10. The feed apparatus of claim 1, further comprising a seal directed towards the transport surface fixed to the wall of the feed box by plates which are pressable towards a rear surface of the wall, wherein the distance adjustment members are configured to decrease the distance between the transport surface of the feed device and the bottom edge of the wall of the feed box to compensate wear of the seals.

11. The feed apparatus of claim 10, wherein the distance of the seal from the transport surface is adjustable by changing a vertical fixing point of the seal relative to the wall, and an opening is formed to the plate for a tool to separate the seal from the plate.

12. The feed apparatus of claim 10, further comprising a grip form for a tool, formed to the seal at place of an opening in the plate.

13. The feed apparatus of claim 12, wherein the grip form is a hole.

14. The feed apparatus of claim 1, wherein the adjusting member is configured to adjust steplessly.

15. The feed apparatus of claim 1, wherein the feed device is a feed conveyor which comprises an endless transport belt.

16. The feed apparatus of claim 1, wherein the distance adjustment members are pivoted to the first frame and to the feed device.

17. A mineral material processing plant, wherein the processing plant comprises a feed apparatus of claim 1.

18. A method comprising:
   feeding mineral material with a feed apparatus that comprises a first frame, a feed box fixed to the first frame and having walls for the mineral material to be loaded to the apparatus, and a feed device which is joined to the first frame so that the material to be loaded to the feed box ends up onto a transport surface of a transport member of the feed device, and the transport surface and a bottom edge of the wall of the feed box are forming a gap therebetween, and the feed device comprises a second frame which is fixed by distance adjustment members to an adjustable distance from the first frame;
   adjusting the mineral material feed apparatus;
   the adjusting comprising moving the transport surface of the feed device and the bottom edge of the wall of the feed box relative to each other by the distance adjustment members;
   wherein the distance adjustment members comprise a lever having a first pivot point pivoted to the first or a second frame and a second pivot point of the lever located at a third distance from the first pivot point and pivoted to a corresponding second or first frame acting as an adjustment pair;
   wherein the distance adjustment members comprise a screw; and
   the adjusting further comprising moving the lever with the screw.

* * * * *